US007519049B2

(12) United States Patent
Masuda (10) Patent No.: US 7,519,049 B2
(45) Date of Patent: Apr. 14, 2009

(54) MOBILE PHONE SYSTEM FOR ALLOWING A USER TO TRANSMIT VOICE MESSAGES

(75) Inventor: Katsuyuki Masuda, Yokohama (JP)

(73) Assignee: Evolium S.A.S., Paris (FR)

( * ) Notice: Subject to any disclaimer, the term of this patent is extended or adjusted under 35 U.S.C. 154(b) by 779 days.

(21) Appl. No.: 10/790,236

(22) Filed: Mar. 2, 2004

(65) Prior Publication Data
US 2004/0208168 A1 Oct. 21, 2004

(30) Foreign Application Priority Data
Apr. 16, 2003 (JP) ............................. 2003-111164

(51) Int. Cl.
*H04L 12/66* (2006.01)
*H04L 29/08* (2006.01)
*H04J 1/02* (2006.01)
(52) U.S. Cl. .................... 370/352; 370/353; 370/354; 370/355; 370/356; 370/493; 455/414.4
(58) Field of Classification Search .................. 370/352, 370/353, 354, 355, 356, 493; 455/466, 445, 455/414.4; 379/93.23, 221.02; 704/246
See application file for complete search history.

(56) References Cited

U.S. PATENT DOCUMENTS

| 5,937,040 | A * | 8/1999 | Wrede et al. ............. 379/93.23 |
| 6,292,553 | B1 * | 9/2001 | Fellingham et al. ..... 379/221.02 |
| 6,363,253 | B1 * | 3/2002 | Valentine et al. ............ 455/445 |
| 6,600,733 | B2 * | 7/2003 | Deng ......................... 370/352 |
| 6,836,668 | B1 * | 12/2004 | Nakano ...................... 455/466 |
| 2003/0233231 | A1 * | 12/2003 | Fellenstein et al. .......... 704/246 |

FOREIGN PATENT DOCUMENTS

| JP | 08-168078 | 6/1996 |
| JP | 2001-134507 | 5/2001 |
| JP | 2001-309425 | 11/2001 |
| JP | 2002-186011 | 6/2002 |
| JP | 2003-110732 | 4/2003 |

OTHER PUBLICATIONS

Patent Abstracts of Japan,, Application No. 08-138545, Dec. 16, 1997 (Casio Comput Co. Ltd.), pp. 1-2.

* cited by examiner

*Primary Examiner*—Thjuan K Addy
(74) *Attorney, Agent, or Firm*—Sughrue Mion, PLLC (57) ABSTRACT

The present invention provides a mobile phone system, which can give a desired voice message to a user of an opposite party terminal without speaking in a state that limitation to usable voice messages has been reduced, while allowing a user existing under an environment that he/she can not speak to listen to a voice from the opposite party terminal. A mobile phone terminal 1 is provided with means 12 for transmitting a connection request of a packet switching line to the side of a network and means 11 for transmitting data corresponding to a desired voice message, while the network is provided with data/voice message converting means 4 for converting transmitted data to a voice message corresponding thereto and means for merging the converted voice message to a circuit switching line of the opposite party terminal to transmit the same.

11 Claims, 3 Drawing Sheets

MOBILE PHONE SYSTEM FOR ALLOWING A USER TO TRANSMIT VOICE MESSAGES

BACKGROUND OF THE INVENTION

1. Field of the Invention

The present invention relates to a mobile phone system, and in particular to a mobile phone system where a voice from an opposite party terminal is transmitted to a mobile phone terminal via a circuit switching line, while a user of the mobile phone terminal transmits data corresponding to a desired voice message via a packet switching line without speaking, and the transmitted data is converted to a voice message on a side of a network and the converted voice message is transmitted to the opposite party terminal via the circuit switching line. The invention is based on a priority application JP 2003-111164 which is hereby incorporated by reference.

2. Description of the Related Art

Since a method for notifying intention to an opposite party without speaking in a conventional mobile phone terminal is only a communication conducted through a mail, the opposite party of communication must have an equipment provided with a mail function (a personal computer, a mobile phone terminal, a personal digital assistance or the like) in order to notify his/her intention to the opposite party without speaking. Therefore, there is such a problem that the opposite party of communication is limited or a sufficient communication can not be achieved.

Further, in case that a user under such an environment that he/she can not speak (more specifically, a user existing in a place which should be kept quiet, such a meeting room, or a public space such as a movie house, a theater or the like, or a user who has a speech disorder) is called through an ordinary voice telephone, there occurs such an inconvenience that a telephonic communication becomes impossible.

In order to solve such a problem, for example, there is such a method as disclosed in JP09-325759A. The method is constituted such that, when a user of a mobile phone terminal on an incoming calling side exists under an environment that he/she can not speak or has circumstances that he/she can speak, the user of the mobile phone terminal listens to a voice of the user on the opposite party terminal and selects a desired voice message from a plurality of voice messages stored in a memory in advance according to key inputting to send a reply of a voice message of a synthesized sound. However, in this method, it is difficult to prepare many voice messages due to a memory capacity limitation of a mobile phone terminal, and the number of kinds of usable voice messages is limited so that a sufficient communication can not be achieved.

Further, considering the conventional mobile phone system from an aspect regarding occupation of a communication line, even if the conventional mobile phone system employs a system where a circuit switching line is occupied for use during transmission of a voice and information is not sent at a time of silence such as CDMA (Code Division Multiple Access) or the like, there is such a problem that an occupation time of a line becomes longer than a case of a packet calling conducted through a packet switching line, which results in disadvantage regarding a capacity on air.

Incidentally, the conventional technical information relating to the mobile phone system is described in detail, for example, in "W-CDMA MOBILE COMMUNICATION SYSTEM" supervised by Keiji TACHIKAWA, which is published on Jun. 25, 2001 from MARUZEN CO., LTD.

[PATENT DOCUMENT 1]

JP09-325795A

[NON-PATENTED DOCUMENT 1]

"W-CDMA MOBILE COMMUNICATION SYSTEM" supervised by Kenji TACHIKAWA and published on Jun. 25, 2001; Publisher: MARUZEN CO, LTD.

SUMMARY OF THE INVENTION

An object of the present invention is to provide a mobile phone system which can transmit a desired voice message to a user of an opposite party terminal without speaking in a state that limitation to usable voice messages has been reduced while allowing a user under such an environment that he/she can not speak (a user existing in a place which should be kept quiet such a meeting room, or a public space such as a movie house, a theater or the like, or a user who has a speech disorder) to listen to a voice from the opposite party terminal.

[Means for Solving the Problem]

In order to achieve the above-described object, a mobile phone system described in claim 1 is a mobile phone system which performs communication between a mobile phone terminal and an opposite party terminal via a network, wherein the mobile phone terminal comprises means for transmitting a connection request of a packet switching line to the side of the network in addition to a calling connection request of a circuit switching line to the opposite party terminal or a calling connection response of a circuit switching line to the opposite party terminal in response to key operation of a user, and means for transmitting data corresponding to a desired voice message via a packet switching line connected with the network on the basis of the connection request, the network comprises data/voice message converting means for converting data transmitted from the mobile phone terminal via the packet switching line to corresponding voice message and means for merging the converted voice message to the circuit switching line to transmit the same to the opposite party terminal, and a voice from the opposite party terminal is transmitted to the mobile phone terminal via the circuit switching line while data from the mobile phone terminal is converted to a voice message by the data/voice message converting means to be transmitted to the opposite party terminal via the circuit switching line.

According to the mobile phone system described in claim 1 with such a constitution, a user of a mobile phone terminal existing under an environment that he/she can not speak can conduct telephonic communication without speaking to trouble persons near him/her conventionally. Further, even a physically handicapped person who can not make voice can conduct telephonic communication with a user of an opposite party terminal. Furthermore, not only a voice message converted by the data/voice message converting means but also sound around the user of the mobile phone terminal can be transmitted to the user of the opposite party terminal via the circuit switching line. Moreover, since the data/voice message converting means is provided on the side of the network, many voice messages can be prepared regardless of a capacity limitation of a memory of the mobile phone terminal, so that intention of the user of the mobile phone terminal can be notified to a user of the opposite party terminal without any limitation.

Further, a mobile phone system described in claim 2, the mobile phone terminal further comprises means for prohibiting transmission of a voice from the mobile phone terminal to the side of the network via the circuit switching line when the means for transmitting a connection request of a packet switching line to the side of the network is actuated.

According to such an aspect, since sound around the mobile phone terminal is not transmitted to a user of an opposite party terminal via the circuit switching line, the circuit switching line from the mobile phone terminal to the side of the network is unoccupied. Data to be transmitted from the mobile phone terminal to the side of the network becomes only data corresponding to a desired voice message via the packet switching line. Since such data can be reduced in information volume, it becomes possible to reduce an occupation time of the packet switching line largely. For this reason, effective use of radio wave can be achieved, so that consumption power required for transmission can be reduced and the transmission time can be shortened. By such an advantage, increase in a subscriber capacity or expansion of a reaching area can be achieved.

Further, in a mobile phone system described in claim 3, the network further comprises notification means, and when the means for transmitting a connection request of a packet switching line to the side of the network is actuated, the notification means notifies that the user of the mobile phone terminal has set a mode where data is converted to a voice message to be transmitted without transmitting voice of the user via the circuit switching line to the opposite party terminal with a voice message.

According to such an aspect, a user of an opposite party terminal can know, according to a voice message transmitted by the notification means, that a user of a mobile phone terminal which is an opposite party of communication exists in an environment that the/she can not speak for some reason. For this reason, the user of the opposite party terminal can take telephonic communication considering an environment where the user of the mobile phone terminal which is the opposite party of communication exists, so that the telephonic communication can be conducted more smoothly.

Further, in a mobile phone system described in claim 4, the means for transmitting data corresponding to a desired voice message, with which the mobile phone terminal is provided, transmits data corresponding to the desired voice message in response to key inputting of the user.

According to such an aspect, a user of a mobile phone terminal can select data corresponding to a desired message easily to transmit the same.

Embodiments of a mobile phone system of the present invention will be explained in detail below with reference to the drawings.

DETAILED DESCRIPTION OF THE INVENTION

EMBODIMENTS OF THE INVENTION

Figure 1:
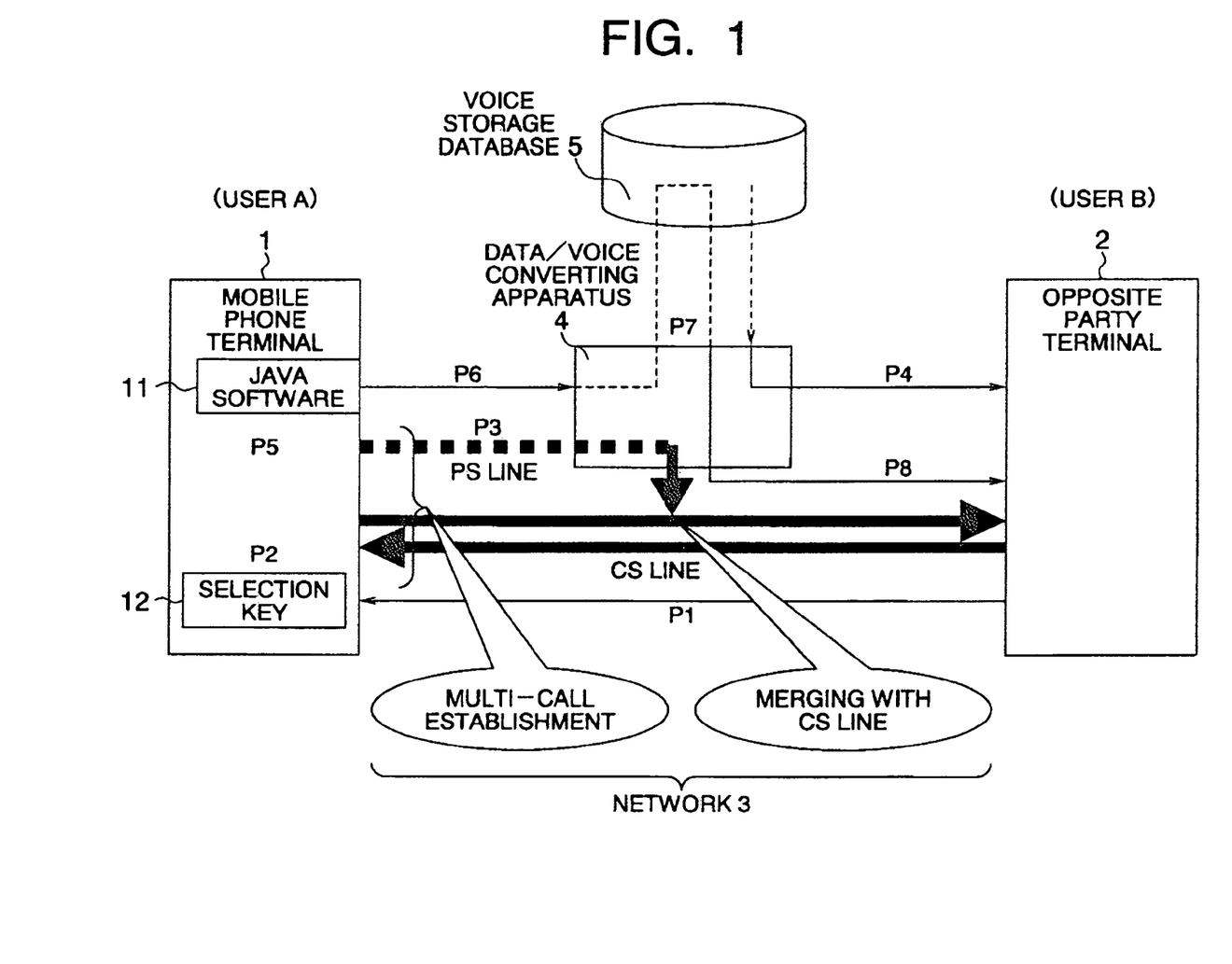
FIG. 1 is an explanatory diagram of a processing procedure in a mobile phone system according to an exemplary embodiment of the present invention.

FIG. 1 is an explanatory diagram of a processing procedure in a mobile phone system of an embodiment according to the present invention.

In FIG. 1, a mobile phone system of this embodiment has a mobile phone terminal 1 which is a mobile phone carried by a user A existing under an environment that he/she can not speak, an opposite party terminal 2 which is a mobile phone or a fixed phone utilized by a user B existing under an ordinary environment, and a network 3 which connects the mobile phone terminal 1 of the user A and the opposite party terminal 2 of the user B to each other. Incidentally, constitution elements of the network 3 are shown in detail in FIG. 2.

At least the mobile phone terminal 1 carried by the user A has a multi-call function (a novel network function added to IMT-2000 core network described in the above-described NON-PATENTED DOCUMENT 1) which can perform a voice communication via a circuit switching (CS, Circuit Switched) line and a packet communication via a packet switching (PS, Packet Switched) line simultaneously. Further, the network 3 can correspond to the multi-call function of the mobile phone terminal 1, and it can establish connection of the circuit switching line for voice communication and connection of the packet switching line for packet communication between the network 3 and the mobile phone terminal 1 when the network 3 receives a request for actuating the multi-call function from the mobile phone terminal 1, for example, a connection request of the packet switching line (PS line) in addition to a connection request of the circuit switching line (CS line).

The network 3 is provided with a data/voice converting apparatus 4 serving as data/voice message converting means for converting data transmitted from the mobile phone terminal 1 of the user A via the packet switching line to corresponding voice message, and a voice storage database 5 which is connected to the data/voice converting apparatus 4 to store therein a voice message corresponding to data transmitted from the mobile phone terminal 1 of the user A via the packet switching line. The voice storage database 5 may be constituted as a constitution element of the data/voice converting apparatus 4. Further, the data/voice converting apparatus 4 and the voice storage database 5 can be constituted as equipment provided on the side of a center for operating the mobile phone system.

The mobile phone terminal 1 of the user A is provided with JAVA® software 11 which is an application software for selecting and transmitting data corresponding to a voice message, and a selection key 12 for selecting "Silent Communication Mode", which is a mode for transmitting a desired voice message to the opposite party terminal 2 without speaking.

Next, a processing procedure in the mobile phone system of this embodiment will be explained with reference to processing step P1 to step P8 shown in FIG. 1.

The processing procedure in FIG. 1 shows an example of a case that the mobile phone terminal 1 of the user A existing under an environment that he/she can not speak is called from the opposite party terminal 2 of the user B existing under an ordinary environment.

In this case, first, a voice call is conducted from the opposite party terminal 2 of the user B existing under an ordinary environment to the mobile phone terminal 1 of the user A existing under an environment that he/she can not speak via the circuit switching line (CS line) of the network 3 (Step P1).

Since the user A of the mobile phone terminal 1 which has received the voice call exists under the environment that he/she can not speak, he/she pushes the selection key 12 to set the "Silent Communication Mode" (Step P2) in order to receive the voice call in the "Silent Communication Mode"

The mobile phone terminal 1 of the user A is set to the "Silent Communication Mode" due to that the use A has pushed the selection key 12, so that a connection request of the packet switching line is transmitted from the mobile phone terminal 1 of the user A to the side of the network 3. The network 3, which has received the connection request of the packet switching line, establishes connection of the packet switching line from the mobile phone terminal 1 of the user A to the side of the network (Step P3).

At the time point of Step P3, a circuit switching line from the opposite party terminal 2 to the network 3 and a circuit switching line from the network 3 to the opposite party terminal 2 are connected between the opposite party terminal 2 of the user B and the network 3. On the other hand, such a state is achieved that a circuit switching line and a packet switching line from the mobile phone terminal 1 to the network 3 and a circuit switching line from the network 3 to the mobile phone terminal 1 have been connected between the mobile phone 1 of the user A and the network 3. That is, the state means that connection of the side of the network 3 corresponding to the multi-call function of the mobile phone terminal 1 of the user A has been established between the mobile phone terminal 1 of the user A and the network 3. Incidentally, at this time point, transmission of voice via the circuit switching line from the mobile phone terminal 1 to the network 3 can be prohibited in order to make the circuit switching line from the mobile phone terminal 1 to the network 3 unoccupied to reduce the information volume of data to be transmitted.

After the network 3 which has received the connection request of a packet switching line from the mobile phone terminal 1 of the user A has established a packet switching line connection between the mobile phone terminal 1 of the user A and the network 3, the network 3 notifies it to the user B of the opposite party terminal 2 who has generated the call via the circuit switching line with a voice message that the user A of the mobile phone terminal 1 who is an opposite party of communication has set a mode where data is converted to a voice message to be transmitted without transmitting a voice of the user A (Step P4).

This notification is implemented through a processing where the data/voice converting apparatus 4 serving as the data/voice message converting means, with which the network 3 is provided, takes a voice message for notifying that the user A of the mobile phone terminal 1 has selected the "Silent Communication Mode" to the user B of the opposite party terminal 2 from the voice storage database 5 to transmit the voice message to the opposite party terminal 2 of the user B via the circuit switching line. The user B of the opposite party terminal 2 who has received the notification can know that the user A of the mobile phone terminal 1 who is the communication opposite party exists under an environment where he/she can not speak for some reason. Therefore, the user B can implement telephonic communication with the user A smoothly by conducting telephonic communication after this notification considering the environment where the user A exists.

Next, the mobile phone terminal 1 of the user A actuates JAVA® software 11 due to that the user A has pushed the selection key 12 to select an incoming call in the "Silent Communication Mode". The user A inputs data corresponding to a voice message which the user A wishes to transmit according JAVA® software 11 (Step P5). The data inputting can be performed, for example, by using a key with which the mobile phone terminal 1 is provided to conduct data inputting, by selecting a selection key displayed on an unillustrated display portion of the mobile phone terminal 1, or the like.

Data corresponding to the voice message is produced by the data inputting conducted by the user A, and is transmitted from the mobile phone terminal 1 of the user A to the data/voice converting apparatus 4 of the network 3 via the packet switching line (Step P6).

The data/voice converting apparatus 4 receives the data transmitted from the mobile phone terminal 1 of the user A via the packet switching line and takes a voice message corresponding to the received data out of the voice storage database 5 (Step P7).

Next, the data/voice converting apparatus 4 merges the voice message taken from the voice storage database 5 to the circuit switching line to transmit the same to the side of the opposite party terminal 2 of the user B. The user B is notified with the voice message transmitted from the user A via the opposite party terminal 2 (Step P8).

According to the above-described Step P1 to Step P8, in case that the mobile phone terminal 1 of the user A existing under an environment where he/she can not speak is called from the opposite party terminal 2 of the user B existing under an ordinary environment, after the user A of the mobile phone terminal 1 who is an opposite party of communication has notified to the user B of the opposite party terminal 2 that he/she has set the mode for converting data to a voice message to transmit the same without transmitting a voice of the user A, a processing for transmitting a voice message which the user A wishes to notify to the user B is performed without speaking of the user A. Thereafter, the user B can respond to the voice message transmitted from the user A to transmit further voice to the mobile phone terminal 1 of the user A via the circuit switching line. Further processing can be performed such that the user A listens to the further voice from the user B to give to the user B further voice message which the user A wishes to notify without speaking according to processing steps similar to Step P5 to Step P8.

Further, the example in FIG. 1 is an example of a case that the mobile phone terminal 1 of the user A existing under an environment that he/she can not speak has been called from the opposite party terminal 2 of the user B existing under an ordinary environment, but it is possible to generate a call from the mobile phone terminal 1 of the user A existing under an environment that he/she can not speak to the opposite party terminal 2 of the user B existing under an ordinary environment.

In the case, without performing Step P1 that a voice call is performed from the opposite party terminal 2 of the user B to the mobile phone terminal 1 of the user A, the processing starts from Step P2 where the user of the mobile phone terminal 1 pushes the selection key 12 to select the silent communication mode to transmit a connection request of a packet switching line from the mobile phone terminal 1 of the user A to the side of the network 3 and generate a connection request and a call to the opposite party terminal 2 of the user B in step P3. Thereafter, a telephonic communication from the mobile phone terminal 1 of the user A existing under an environment that he/she can not speak to the opposite party terminal 2 of the user B existing under an ordinary environment is carried out by performing a processing similar to the processing shown in Step P4 to Step P8.

Figure 2:
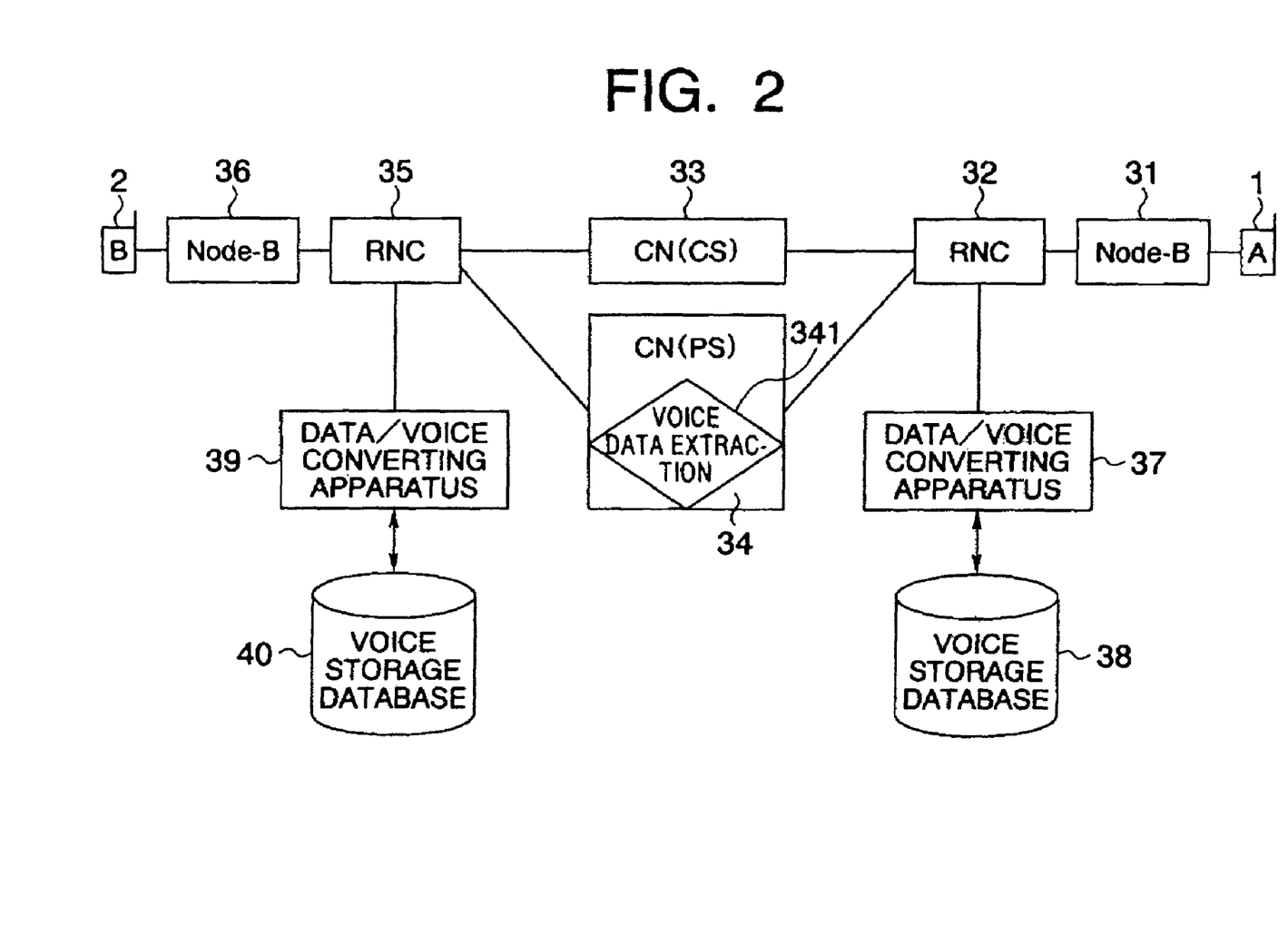
FIG. 2 is a diagram showing constitution elements of a network in the mobile phone system according to an exemplary embodiment of the present invention.

FIG. 2 is a diagram showing constitution elements of the network 3 in the mobile phone system of the embodiment according to the present invention and explaining a correspondence with the processing procedure explained using the constitution elements of the network 3 and FIG. 1.

The network 3 shown in FIG. 2 is provided with a node B31 connected to the mobile phone terminal 1 of the user A, a node B36 connected to the mobile phone terminal 2 of the user B which is the opposite party terminal, a radio network RNC32 connected to the node B31 on the side of the mobile phone terminal 1 of the user A, a radio network RNC35 connected to the node B36 on the side of the user B, a core network CN (CS) 33 for circuit switching which connects these radio networks RNC32 and RNC35, a core network for packet switching CN (PS) 34 which connects these radio networks RNC 32 and RNC 35, a data/voice converting apparatus 37 serving as the data/voice message converting means connected to the radio network RNC32 connected to the node B31 on the side of the mobile phone terminal 1 of the user A, a voice storage database 38 connected to the data/voice converting apparatus 37, a data/voice converting apparatus 39 serving as the data/voice message converting means connected to the radio network RNC35 connected to the node B36 on the side of the mobile phone terminal 2 of the user B, and a voice storage database 40 connected to the data/voice converting apparatus 39.

The network 3 causes the core network for circuit switching CN (CS) 33 and the core network for packet switching CN (PS) 34 to be connected between the radio networks RNC 32 and 35 when the multi-call functions of the mobile phone terminal 1 and the opposite party terminal 2 are actuated. Further, the core network for packet switching CN (PS) 34 is provided with voice data extracting means 341.

Next, the processing procedure, shown in FIG. 1, of the case that the mobile phone terminal 1 of the user A existing under an environment that he/she can not speak is called from the mobile phone terminal 2 of the user B existing under an ordinary environment will be further explained in detail with reference to the constituent shown in FIG. 2.

First, in Step P1 that a voice call is performed from the mobile phone terminal 2 of the user B existing under an ordinary environment to the mobile phone terminal 1 of the user A existing under an environment that he/she can not speak, a connection request is transmitted from the mobile phone terminal 2 of the user B to the mobile phone terminal 1 of the user A. The network 3 establishes connection to the mobile phone terminal 1 of the user A from the opposite party terminal 2 of the user B via the node B36, the radio network RNC35, the core network CN (CS), the radio network RCN 32 and the node B31. Then, the user B generates a voice call from the mobile phone terminal 2, where the voice call is transmitted to the mobile phone terminal 1 of the user A via a route passing through the node B36, the radio network RNC 35, the core network CN (CS) 33, the radio network RCN32, and the node B31, which is an established route.

Next, in Step P2, since the user A of the mobile phone terminal 1 who has received the voice call exists under an environment that he/he can not speak, he/she pushes the selection key 12 to set the "Silent Communication Mode" for an incoming call in "Silent Communication Mode".

In the subsequent Step P3, a connection request of the packet switching line is transmitted from the mobile phone terminal 1 to the side of the network 3 via the node B32. Upon receipt of the connection request of the packet switching line, the core network CN (PS) 34 is connected between the radio network RNC32 on the side of the user A and the radio network RNC35 on the side of the user B. That is, the network 3 establishes connection corresponding to the multi-call function of the mobile phone terminal 1.

Next, in Step P4, it is notified to the data/voice converting apparatus 37 via the node B31 and the radio network RNC32 that the user A of the mobile phone terminal 1 has set the "Silent Communication Mode" in order to notify to the user B of the opposite party terminal 2 who generates a call that the user A of the mobile phone terminal 1 who is an opposite party of communication exists under an environment that he/she can not speak for some reason. The notified data/voice converting apparatus 37 takes a voice message corresponding to the fact that the "Silent Communication Mode" has been set from the voice storage database 38 to be connected to transmit the voice message to the opposite party terminal 2 of the user B via the radio network RNC 32, the core network CN (CS) 33, the radio network RNC35 and the node B36. The opposite party terminal 2 notifies the received voice message to the user B.

Next, in Step P5, when the user A listens to the voice of the user B from the mobile phone terminal 1 and inputs data corresponding to a voice message to be notified to the user B, the data corresponding to the voice message to be given is transmitted to the side of the network 3 in Step P6. Here, for example, assuming that the user A has selected data "1" corresponding to such a voice message "Yes, A speaking", packet data obtained by adding "Silent Communication Mode Information" to the data "1" is transmitted from the mobile phone terminal 1 of the user A to the core network CN (PS) 34 via the node B31 and the radio network RNC32.

When it is detected that "Silent Communication Mode Information" is included in the transmitted packet data, only packet data corresponding to the voice message is extracted from the packet data received in the core network CN (PS) 34 by voice data extracting means 341. Unless it is detected that the "Silent Communication Mode Information" is included in the transmitted packet data, an ordinary packet communication to the opposite party terminal 2 of the user B is conducted via the radio network RNC35 and the node B36.

Next, in Step P7, data corresponding to the voice message extracted in the core network CN (PS) 34 is returned back to the radio network RNC 32 and sent to the data/voice converting apparatus 37. The data/voice converting apparatus 37 collates the sent data with voice messages stored in the voice storage database 38 in advance so that collation check about which voice message should be taken out is performed. In case of this example, the voice message corresponding to the packet data "1" is "Yes, A speaking", and data regarding the voice message "Yes, A speaking" corresponding to the packet data "1" is taken out of the voice storage database 38.

In Step P8, the data/voice converting apparatus 37 converts the data taken out of the voice storage database 38 to an actual voice message "Yes, A speaking" to merge to the core network CN (CS) 33 via the radio network RNC32 and transmit the same to the opposite party terminal 2 of the user B via the radio network RNC35 and the node B36.

Incidentally, the above-explained processing shows a processing procedure in case that the mobile phone terminal 1 of the user A existing under an environment where he/she can not speak is called from the opposite party terminal 2 of the user B existing under an ordinary environment, but even a case that the opposite party terminal 2 of the user B existing under an ordinary environment is called from the mobile phone terminal 1 of the user A existing under an environment that he/she can not speak can be processed according to a procedure almost similar to the procedure explained with respect to FIG. 1.

Figure 3:
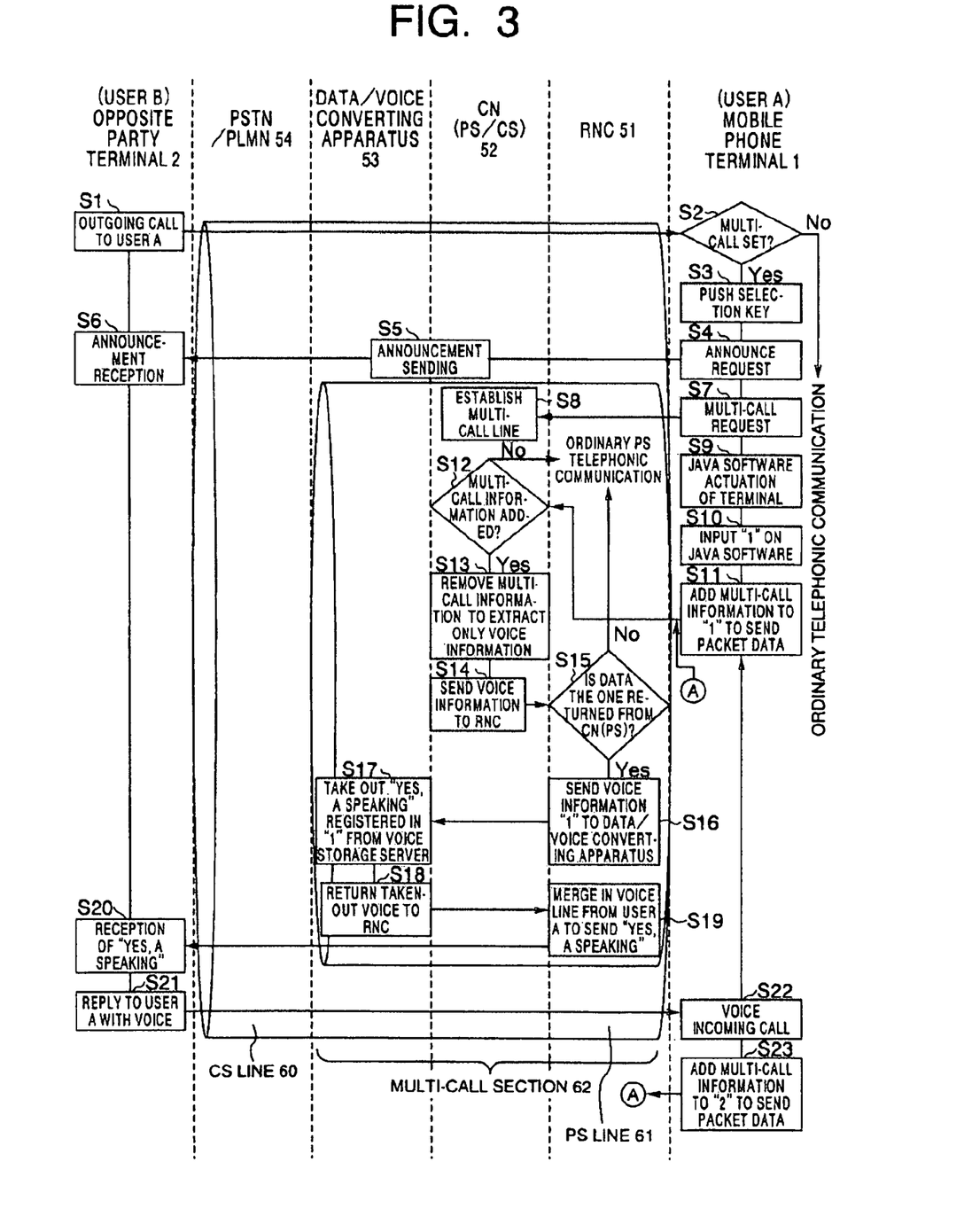
FIG. 3 is a flowchart showing a processing in another embodiment of a mobile phone system according to the present invention.

FIG. 3 is a flowchart showing a processing in another embodiment of a mobile phone system according to the present invention. Incidentally, in FIG. 3, the network 3 between the mobile phone terminal 1 of the user A and the opposite party terminal 2 of the user B is provided with a circuit switching (CS) line 60, a packet switching (PS) line 61, and a multi-call section 62 including the circuit switching line 60 and the packet switching line 61.

FIG. 3 shows a processing procedure conducted when the mobile phone terminal 1 of the user A existing under an environment where he/she can not speak is called from the opposite party terminal 2 of the user B existing under an ordinary environment.

The network 3 shown in FIG. 3 is provided with a radio network RNC51 corresponding to the node B31 and the radio network 32 shown in FIG. 2, a core network CN (PS/CS) 52 corresponding to the core network CN (CS) 33 and the core network CN (PS) 34 shown in FIG. 2, a data/voice converting apparatus 53 corresponding to the data/voice converting apparatus 37 and the voice storage database 38 shown in FIG. 2, and PSTN (Public Switched Telephone Network)/PLMN (Public Land Mobile Network) 54 which is a conventional analog telephone network/public land mobile network corresponding to the radio network RNC 35 and the node B 36 shown in FIG. 2.

First, a voice call from the opposite party terminal 2 of the user B existing under an ordinary environment to the mobile phone terminal 1 of the user A existing under an environment that he/she can not speak is performed via the PSTN/PLMN 54, the core network CN (PS/CS) 52 and the radio network 51 (Step S1).

The user A who has received this calling at his/her mobile phone terminal 1 judges whether or not he/she should select the "Silent Communication Mode", namely the multi-call function (Step S2).

In case that the multi-call function has not been selected, the user A received the calling as an ordinary voice communication. Further, in case that the user A has selected the multi-call function, he/she pushes the selection key 12 corresponding to the multi-call function (Step S3).

The mobile phone terminal 1 of the user A requires the network 3 side to announce that the call has been received in the "Silent Communication Mode" to the user B of the opposite party of communication in response to selection of the multi-call function made by the user A (Step S4).

The announce request of the notification transmitted to the data/voice converting apparatus 53 via the radio network 51 and the core network CN (PS/CS) 52 is converted to a voice message by the data/voice converting apparatus 53 to be transmitted to the opposite party terminal 2 of the user B via the PSTN/PLMN 54 (Step S5).

The opposite party terminal 2 of the user B receives this voice message to notify the user B of the same (Step S6).

On the other hand, the user A pushes the selection key 12 corresponding to the multi-call function of the mobile phone terminal 1 so that the mobile phone terminal 1 of the user A requests the core network CN (PS/CS) 52 to establish a multi-call line via the radio network RNC51 (Step S7). That is, the mobile phone terminal 1 of the user A requests additional connection of a packet switching line in addition to the connection of the circuit switching line in the core network CN (PS/CS) 52.

Upon receipt of the connection request of the multi-call line, the core network CN (PS/CS) 52 establishes the multi-call line (Step S8).

Further, when the selection key 12 corresponding to the multi-call function of the mobile phone terminal 1 is pushed by the user A, the mobile phone terminal 1 actuates JAVA® software 11 for inputting data corresponding to a desired voice message to be transmitted by the user A (Step S9).

Using JAVA® software 11, the user A inputs data corresponding to the desired voice message to be transmitted according to key inputting performed by the key provided in the mobile phone terminal 1 or a selection key displayed on the unillustrated display portion of the mobile phone terminal 1 (Step S10). For example, the user A selects and inputs the data "1" corresponding to the voice message such as, for example, "Yes, A speaking".

Next, a packet data where information indicating that the mobile phone terminal 1 is in the multi-call function is added to information indicating the data "1" corresponding to the desired voice message to be transmitted is transmitted to the core network CN (PS/CS) 52 via the radio network 51 (Step S11).

Upon receipt of the packet data transmitted from the mobile phone terminal 1 of the user A, the core network CN (PS/CS) 52 verifies whether or not the information indicating that the mobile phone terminal 1 is in the multi-call function is added to the received packet data (Step S12).

In case that the information indicating that the mobile phone terminal 1 is in the multi-call function is not added to the packet data, the core network CN (PS/CS) 52 relays an ordinary packet data communication. However, in case that the information indicating that the mobile phone terminal 1 is in the multi-call function is added, the core network CN (PS/CS) 52 removes the information indicating that the mobile phone terminal 1 is in the multi-call function from the received packet data to extract only the packet data corresponding to the voice message (Step S13).

Thereafter, the core network CN (PS/CS) 52 transmits the packet data corresponding to the extracted voice message to the radio network RNC51 (Step S14).

The radio network RNC51 to which the packet data is transmitted from the core network CN(PS/CS)52 verifies whether or not the received packet data is the packet data returned from the core network CN(PS/CS)52 (Step S15).

The radio network RNC51 proceeds to a relay for an ordinary PS telephonic communication unless the received packet data is the returned packet data from the core network CN (PS/CS)52. On the other hand, when the received packet data is the packet data returned from the core network CN (PS/CS)52, the radio network RNC51 sends the data "1" included in the packet data to the data/voice converting apparatus 21 (Step S16).

Upon receipt of data sent from the radio network 51, the data/voice converting apparatus 51 collates the data with the voice storage database connected thereto in order to take out the voice message "Yes, A speaking" corresponding to the data "1" (Step S17).

The voice message "Yes, A speaking" taken out by the data/voice converting apparatus 21 is returned back to the radio network RNC51 (Step S18).

The radio network RNC51 to which the voice message "Yes, A speaking" is returned merges the voice message "Yes, A speaking" in the CS line of the core network CN(PS/CS) 52 and the PSTN/PLMN 54 to transmit the same to the opposite party terminal 2 of the user B (Step S19).

The opposite party terminal 2 of the user B receives the transmitted voice message ("Yes, A speaking") to perform voice output (Step S20).

According to the above-described Step S1 to step S20, a series of processings where the voice message from the mobile phone terminal 1 of the user A which has responded the voice call from the opposite party terminal 2 of the user B is transmitted to the user B are conducted.

The user B who has listened to the voice message from the user A further responds to the user A with voice (Step S21).

The voice response from the user B is transmitted to the mobile phone terminal 1 of the user A via a route similar to that in Step S1, i.e., the PSTN/PLMN 54, the core network CN(PS/CS)52 and the radio network 51 to be received by the mobile phone terminal 1 (Step S22).

Since the silent communication mode has been already selected and JAVA® software has been actuated in the mobile phone terminal 1 of the user A, the user A can input data "2" corresponding to a voice message to be transmitted next (for example, "I will call you later") using the mobile phone terminal 1. A packet data where information indicating the multi-call function has been added to the data "2" corresponding to the voice message to be transmitted next is transmitted from the mobile phone terminal 1 of the user A to the core network CN(PS/CS) 52 via the radio network 51 (Step S23).

In the Step S23 and steps subsequent thereto, a voice message to be transmitted next (for example, "I will call you later.") from the user A to the user B is transmitted to the opposite party terminal 2 of the user B according to a processing similar to the above-described Step S12 to Step S20.

According to a similar processing subsequent thereto, the user B sends his/her voice to the user A and the user A listens to the voice to send data corresponding to a desired voice message to the side of the network, thereby sending the desired voice message to the user B, and the user B can listen to the voice message from the user A. As described above, the user B can perform communication of messages with voice to the user A existing under an environment that he/she can not speak.

Further, the example shown in FIG. 3 shows the processing procedure taken when the mobile phone terminal 1 of the user A existing under an environment that he/she can not speak is called from the opposite party terminal 2 of the user B existing under an ordinary environment, but a processing procedure taken when the opposite party terminal 2 of the user B existing under an ordinary environment is called from the mobile phone terminal 1 of the user A existing under an environment that he/she can not speak can be implemented by starting from an operation that the user A pushing he selection key 12 corresponding to the multi-call function of Step S3. Next, in Step S4, a calling to the user B is conducted along with an announcement of "Silent Communication Mode" to the opposite party terminal 2 of the user B and thereafter telephonic communication can be performed according to similar processing steps.

In the example shown in FIG. 3, sound around the user A can be transmitted, as it is, to the opposite party terminal 2 of the user B via the radio network RNC 51, the core network CN (PS/CS) 52 and the PSTN/PLMN 54, but the sound can be prohibited.

[Advantage of the Invention]

As described above, according to the mobile phone system of the present invention, a user of a mobile phone terminal who exists under an environment that he/she can not speak can conduct telephonic communication without troubling persons around him/her by speaking as with the conventional mobile phone terminal. Further, even a physically handicapped person who can not speak can conduct telephonic communication with a user of an opposite party terminal. Furthermore, a sound around the user of the mobile phone terminal in addition to a voice message converted by the data/voice message converting means can be notified to the user of the opposite party terminal via the circuit switching line. Moreover, since the data/voice message converting means is provided on the side of the network, many voice messages can be prepared regardless of a capacity limitation of a memory on the side of the mobile phone terminal, and intention of the user of the mobile phone terminal can be given to the user of the opposite party terminal without any limitation.

Further, when the mobile phone terminal is further provided with the means for prohibiting transmission of a voice from the mobile phone terminal to the side of the network via the circuit switching line when the means for transmitting a connection request of a packet switching line to the side of the network is actuated, the circuit switching line from the mobile phone terminal to the side of the network becomes unoccupied, because sound around the mobile phone terminal is not transmitted to the user of the opposite party terminal via the circuit switching line. Data to be transmitted from the mobile phone terminal to the side of the network is only data corresponding to a desired voice message via the packet switching line. Since such data can be reduced in information amount, it becomes possible to shorten an occupation time of the packet switching line largely. For this reason, effective utilization of radio wave can be achieved, and consumption power required for transmission can be reduced and a transmission time can be shortened. According to such an advantage, increase in number of subscriber capacity, expansion of reaching area and the like can be achieved.

Further, when the notification means for notifying that a user of a mobile phone terminal has set the mode for converting data to a voice message to transmit the same to an opposite party terminal via the circuit switching line with a voice message without transmitting a voice of the user when the means for transmitting a connection request of a packet switching line to the side of the network is actuated is further provided, a user of the opposite party terminal can know that the user of the mobile phone terminal, who is an opposite party of communication, exists under an environment that he/she can not speak for some reason from a voice message transmitted by the notification means. For this reason, the user of the opposite party terminal can conduct telephonic communication considering an environment where the user of the mobile phone terminal who is an opposite party of telephonic communication exists, so that telephonic communication can be implemented more smoothly.

Furthermore, when the means for transmitting data corresponding to a desired voice message in response to key inputting conducted by a user is provided, the user of the mobile phone terminal can transmit data corresponding to his/her desired message easily.

EXPLANATION OF REFERENCE NUMERALS

1: mobile phone terminal
2: opposite party terminal
3: network
4, 37, 39, 53: data/voice converting apparatus
5, 38, 40: voice storage database
11: JAVA® software
12: selection key
31, 36: node B
32, 35, 51: radio network RNC
33: core network CN (CS)
34: core network CN (PS)
52: core network CN (PS/CS)
54: PSTN/PLMN
60: circuit switching line
61: packet switching line
62: multi-call section
341: voice data extracting means

The invention claimed is:

1. A mobile phone system which performs communication between a mobile phone terminal and an opposite party terminal via a network, wherein the mobile phone terminal comprises means for transmitting a connection request of a packet switching line to the side of the network in addition to a calling connection request of a circuit switching line to the opposite party terminal or a calling connection response of a circuit switching line to the opposite party terminal in response to key operation of a user, and means for transmitting data corresponding to a desired voice message via a packet switching line connected with the network on the basis of the connection request, the network comprises data/voice message converting means for converting data transmitted from the mobile phone terminal via the packet switching line to corresponding voice message, and means for merging the converted voice message to the circuit switching line to transmit the same to the opposite party terminal, and a voice from the opposite party terminal is transmitted to the mobile phone terminal via the circuit switching line, while data from the mobile phone terminal is converted to a voice message by the data/voice message converting means to be transmitted to the opposite party terminal via the circuit switching line.

2. A mobile phone system according to claim 1, wherein the mobile phone terminal further comprises means for prohibiting transmission of the voice from the mobile phone terminal to the side of the network via the circuit switching line when the means for transmitting a connection request of a packet switching line to the side of the network is actuated.

3. A mobile phone system according to claim 1 or 2, wherein the network further comprises notification means, and when the means for transmitting a connection request of a packet switching line to the side of the network is actuated, the notification means notifies that the user of the mobile phone terminal has set a mode where data is converted to a voice message to be transmitted without transmitting a voice of the user via the circuit switching line to the opposite party terminal as a voice message.

4. A mobile phone system according to any one of claims 1 and 2, wherein the means for transmitting data corresponding to a desired voice message, with which the mobile phone terminal is provided, transmits data corresponding to the desired voice message in response to key inputting of the user.

5. A mobile phone system according to claim 3, wherein the means for transmitting data corresponding to a desired voice message, with which the mobile phone terminal is provided, transmits data corresponding to the desired voice message in response to key inputting of the user.

6. A mobile phone system performing communication between a first mobile terminal and a second terminal via a network, the system comprising:

the first mobile terminal comprises:
means for executing a multi-call function, which allows voice communication via circuit switching and packet communication via packet switching at substantially same time,
means for selecting a silent communication mode, in which a voice message is transmitted to the second terminal without any speech input into the first mobile terminal,
means for transmitting a connection request of the packet switching line to the network and a calling connection request of the circuit switching line to the second terminal or a calling connection response of the circuit switching line to the second terminal in response to output of the selecting means, and
means for transmitting data corresponding to a desired voice message via a packet switching line connected with the network on the basis of the connection request; the network comprises:
data/voice message converting means for converting data transmitted from the mobile phone terminal via the packet switching line to corresponding voice message, and
means for merging the converted voice message to the circuit switching line to transmit the converted voice message to the second terminal; and
the second terminal connected to the network at least via the circuit switching line,
wherein the second terminal transmits to the first mobile terminal via the circuit switching line, while data from the first mobile terminal is converted to a voice message by the data/voice message converting means to be transmitted to the second terminal via the circuit switching line.

7. The system according to claim 6, wherein the network further comprises:
at least one node connected to the first mobile terminal and at least one node connected to the second terminal,
at least one radio network controller connected to the data/voice message converting means, which is connected with a voice storage database,
a first core network entity, which is configured to connect the at least one radio network controller and executes circuit switching, and
a second core network entity, which is configured to connect the at least one radio network controller and executes data switching, and which includes the merging means.

8. The system according to claim 7, wherein the second core network entity extracts the voice message from the packet data.

9. The mobile phone system according to claim 1, wherein said data corresponding to the desired voice message transmitted by the mobile phone terminal to the network via the packet switching line connected with the network does not comprise speech data spoken by a user of said mobile phone terminal corresponding the desired voice message.

10. The mobile phone system according to claim 6, wherein said data corresponding to the desired voice message transmitted by the first mobile terminal to the network via the packet switching line connected with the network does not comprise speech data spoken by a user of said first mobile terminal corresponding the desired voice message.

11. The mobile phone system according to claim 1, wherein the opposite party terminal receives the desired voice message in convened form as converted by the converting means.

* * * * *